US008171830B2

(12) United States Patent
Ozawa

(10) Patent No.: US 8,171,830 B2
(45) Date of Patent: May 8, 2012

(54) MACHINE TOOL

(75) Inventor: Satoru Ozawa, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 958 days.

(21) Appl. No.: 12/118,380

(22) Filed: May 9, 2008

(65) Prior Publication Data

US 2008/0276772 A1    Nov. 13, 2008

(30) Foreign Application Priority Data

May 10, 2007  (JP) .................................. 2007-125581

(51) Int. Cl.
*B23B 19/02* (2006.01)
*B23B 13/08* (2006.01)

(52) U.S. Cl. .......................................... 82/147; 82/142

(58) Field of Classification Search ............ 82/117, 82/123, 142, 152, 161, 165, 147
See application file for complete search history.

(56) References Cited

U.S. PATENT DOCUMENTS

| 4,246,813 | A | 1/1981 | Grachev et al. | |
| 6,665,579 | B2* | 12/2003 | Sasaki et al. | 700/159 |
| 6,817,273 | B2* | 11/2004 | Hugick et al. | 82/110 |
| 7,165,302 | B2* | 1/2007 | Kikkawa et al. | 29/426.1 |
| 7,464,628 | B2* | 12/2008 | Shinohara et al. | 82/117 |
| 7,930,956 | B2* | 4/2011 | Belpanno et al. | 82/110 |
| 2002/0183888 | A1* | 12/2002 | Sasaki et al. | 700/159 |
| 2007/0224007 | A1* | 9/2007 | Shinohara et al. | 408/146 |
| 2010/0257980 | A1* | 10/2010 | Hyatt et al. | 82/1.11 |

FOREIGN PATENT DOCUMENTS

| DE | 30 19 627 | 12/1980 |
| GB | 1 202 955 | 8/1970 |
| JP | 51-018386 A | 2/1976 |
| JP | 3-40488 | 8/1991 |
| JP | 7-19694 | 5/1995 |
| JP | 2000024853 A | 1/2000 |
| JP | 2000075072 A | 3/2000 |
| JP | 2000161554 A | 6/2000 |
| JP | 2006-326732 | 12/2006 |
| JP | 2008279559 A * | 11/2008 |

(Continued)

OTHER PUBLICATIONS

Extended European Search Report for European Application No. 081557721-2302, mailed on Aug. 8, 2008 (5 pages).

(Continued)

*Primary Examiner* — Boyer D Ashley
*Assistant Examiner* — Sara Addisu
(74) *Attorney, Agent, or Firm* — Osha • Liang LLP

(57) ABSTRACT

According to one embodiment, a machine tool for machining a workpiece includes: a main spindle that holds the workpiece to rotate the workpiece around a axis; a tool that is configured to machine the workpiece by working together with the main spindle; a headstock that rotatably supports the main spindle and includes a leading-edge portion and a base-end portion; and a bed that supports the headstock by a sliding bearing at the leading-edge portion and rolling bearings at two points of the base-end portion so that the headstock is movable along an axial line of the main spindle, wherein the two points of the base-end portion are spaced apart from each other in a direction orthogonal to the axial line of the main spindle.

16 Claims, 8 Drawing Sheets

FOREIGN PATENT DOCUMENTS

WO 2005/065869 7/2005
WO WO 2005065869 A1 * 7/2005

OTHER PUBLICATIONS

Office Action in corresponding Japan application No. 2007-125581, with English translation, dated Sep. 20, 2011. (5 sheets total).
English Patent Abstract of JP 200075072 from esp@cenet, published Mar. 14, 2011, 1 page.
Office Action dated Dec. 1, 2010, in corresponding Chinese patent application No. 2008100993057, and English translation thereof, 7 pages total.
English Patent Abstract of Japan, Publication No. 2000-24853, Publication Date Jan. 25, 2000.
English Patent Abstract of Japan, Publication No. 2000-161554, Publication Date Jun. 16, 2000.

* cited by examiner

MACHINE TOOL

BACKGROUND OF THE INVENTION

1. Field of the Invention

The present invention relates to a machine tool that grips a rod-shaped workpiece at a leading edge of a main spindle and that subjects the workpiece to machining, such as cutting or boring, and more particularly to a machine tool made up of a lathe of main spindle movable type that moves a main spindle along an axis during machining.

2. Background Art

In relation to a machine tool of this type, a configuration as described in; for example, JP-UM-B-3-40488, has hitherto been proposed as a lathe of main spindle movable type that subjects an elongated rod-shaped workpiece to machining.

In the related-art configuration described in JP-UM-B-3-40488, a guide bush for supporting forward of the main spindle the leading edge of the workpiece in an insertable manner can be removably attached. When the guide bush is in an attached state, the workpiece gripped by the main spindle is also supported by the guide bush and subjected to machining, such as cutting, forward of the guide bush by means of a cutting tool on the tool post. In this case, the guide bush receives a load that acts on a workpiece during machining in a direction orthogonal to the axial direction of the workpiece. Therefore, even when the workpiece is elongated and easily deflectable, the workpiece can be machined with high precision.

In the meantime, in the related-art configuration of JP-UM-B-3-40488, when the guide bush is removed, a short workpiece can be machined. In relation to a lathe of main spindle movable type arranged so as to be able to machine a short workpiece, a configuration such as those described in connection with JP-A-2006-326732 and JP-UM-B-7-19694 has been proposed.

In the related-art configurations described in JP-A-2006-326732 and JP-UM-B-7-19694, the guide bush is not provided.

In a configuration described in JP-A-2006-326732, a through hole for causing the main spindle to pass in a non-contacting state is formed in the tool post support. In association with advancement of the headstock, the leading edge of the main spindle penetrates through the through hole, to thus project forward of the tool post support, and the workpiece is machined by means of the cutting tool on the tool post. Further, in a configuration described in JP-UM-B-7-19694, the headstock is supported in a penetrating manner on an upper frame so as to become movable in the axial direction of the main spindle by way of a horizontal sliding guide surface and a vertical sliding guide surface arranged in the shape of a cross. The workpiece is machined forward of the upper frame by means of the cutting tool on the tool post.

Incidentally, the related-art configurations present the following drawbacks.

First, in the related-art configuration described in JP-UM-B-3-40488, in a state where the guide bush is attached forward of the main spindle, space including the length of the guide bush is formed between the main spindle and the guide bush, and a remaining material of a workpiece whose length corresponds to the space arises. Therefore, when the guide bush is in an attached state, the workpiece cannot be utilized effectively. In addition, in the case of a short workpiece, the guide bush interferes with the workpiece, thereby posing difficulty in machining the short workpiece.

In the related-art configuration of JP-UM-B-3-40488 in which the guide bush is removed and the related-art configurations of JP-A-2006-326732 and JP-UM-B-7-19694, no guide bush is present, and hence a problem such as that mentioned above does not occur.

However, in the related-art configuration of JP-UM-B-3-40488 in which the guide bush is removed, a guide sleeve is attached onto a guide bush support bed in lieu of the guide bush on the support bet, and a cylindrical sleeve attached a leading edge of a main spindle is slidingly guided along an internal peripheral surface of the guide sleeve constituting a sliding bearing. Therefore, in this state, the main spindle is substantially extended forwardly by an amount corresponding to the length of the cylindrical sleeve. In this state, there is required guide rigidity of the order of magnitude which enables only a base end of the main spindle to support the main spindle. Therefore, in order to firmly guide the leading edge of the main spindle, by means of a sliding bearing, to such an extent that load imposed during machining can be born, the precision of a guide section on the leading-edge side of the main spindle with respect to a guide section on the base-end side of the main spindle must be enhanced extremely high. In reality, acquisition of such precision is impossible. Even if such precision can be achieved, very high cost will be incurred. In order to solve the problem, the rigidity of the guide on the leading-edge side of the main spindle must be weakened considerably. Therefore, if an attempt is made to actually provide the configuration described in JP-UM-B-3-40488, there is no alternative way but to weaken the rigidity of the guide to such an extent that the load imposed during machining cannot be born by the leading-edge side of the main spindle. For this reason, the base-end side of the main spindle chiefly bears load in an overhanging state as described in connection with JP-A-2006-326732, so that the rigidity of the main spindle resultantly decreases and that machining precision is reduced.

In the related-art configuration described in JP-A-2006-326732, a guide member for guiding and supporting the headstock so as to be movable in the axial direction of the main spindle is disposed at the rear of the tool post support so as to avoid interference with the tool post support. The main spindle and the leading-edge portion of a support sleeve supporting the main spindle are disposed in a cantilever fashion while greatly overhanging forwardly from the guide member. Therefore, difficulty is encountered in imparting high support rigidity to the main spindle during machining, which in turn reduces machining precision.

Moreover, in the related-art configuration described in JP-UM-B-7-19694, the upper frame and the cutting tool are in close proximity to each other, and hence machining with high rigidity is possible. However, the guide configuration of the headstock with respect to the upper frame is made up of a horizontal sliding guide surface and a vertical sliding guide surface that are, on the whole, arranged in the shape of across. Therefore, the configuration of the guide surfaces is complicate. Further, since the number of guide surfaces is large, there is a potential risk of a warp, and machining guide surfaces involves consumption of much effort, as well.

SUMMARY OF THE INVENTION

The present invention has been conceived while attention is paid to those drawbacks in the related art. An objective of the present invention is to provide a machine tool that is smoothly guidable and movable a headstock along an axial direction of a main spindle with high rigidity and accuracy; that is effectively utilizable a workpiece; that is enhancable machining precision and efficiency of a workpiece; and that easily machines guide surfaces.

In order to achieve the objective, the present invention is characterized by a machine tool, wherein a leading-edge portion of a headstock, on which a main spindle is rotatably supported, is supported by a bed by way of a sliding bearing so as to be movable along an axial direction of the main spindle; and a base-end portion of the headstock is supported on the bed at two points, which are spaced apart from each other in a direction orthogonal to the axial direction of the main spindle, so as to move in the axial direction of the main spindle by way of a rolling bearing.

Accordingly, the machine tool of the present invention can guide and move a headstock, at a leading-edge portion close to a position for machining a workpiece, with high accuracy along an axial direction of a main spindle by means of a sliding bearing. At a base-end portion spaced apart from the position for machining a workpiece, the headstock is smoothly guided and moved by means of a rolling bearing. Therefore, the main spindle is guided by means of guide surfaces of simple shapes, and an attempt is made to enhance the machining precision and efficiency of a workpiece.

In the configuration, a tool post support on which a tool post is supported may be fastened onto the bed, and the leading-edge portion of the main spindle may be supported by the tool post support by way of the sliding bearing.

In the above configuration, the headstock may have a spindle sleeve; the main spindle may be rotatably supported in the spindle sleeve; and the spindle sleeve may also be configured so as to be supported by the sliding bearing.

Further, in the configuration, the rolling bearing may also be embodied as a ball bearing that moves over a guide rail.

In addition, it is better to dispose the rolling bearing on both sides of the axial direction of the main spindle. By means of this configuration, the headstock can be supported in a well-balanced manner.

As mentioned above, according to the present invention, a short workpiece can be machined, which in turn enables effective utilization of the workpiece. The headstock can be smoothly guided and moved with high rigidity and precision along the axial direction of the main spindle, so that there is yielded an advantage of the ability to enhance the accuracy and efficiency of machining of a workpiece, and the like.

According to an aspect of the present invention, there is provided a machine tool for machining a workpiece including: a main spindle that holds the workpiece to rotate the workpiece around an axis; a tool that is configured to machine the workpiece by working together with the main spindle; a headstock that rotatably supports the main spindle and includes a leading-edge portion and a base-end portion; and a bed that supports the headstock by a sliding bearing at the leading-edge portion and rolling bearings at two points of the base-end portion so that the headstock is movable along an axial line of the main spindle, wherein the two points of the base-end portion are spaced apart from each other in a direction orthogonal to the axial line of the main spindle.

BRIEF DESCRIPTION OF THE DRAWINGS

The present invention may be more readily described with reference to the accompanying drawings.

DETAILED DESCRIPTION OF THE PREFERRED EMBODIMENTS

The First Preferred Embodiment

A first embodiment in which the present invention is embodied as a lathe of main spindle movable type will be described hereunder by reference to FIGS. 1 through 6.

Figure 1:
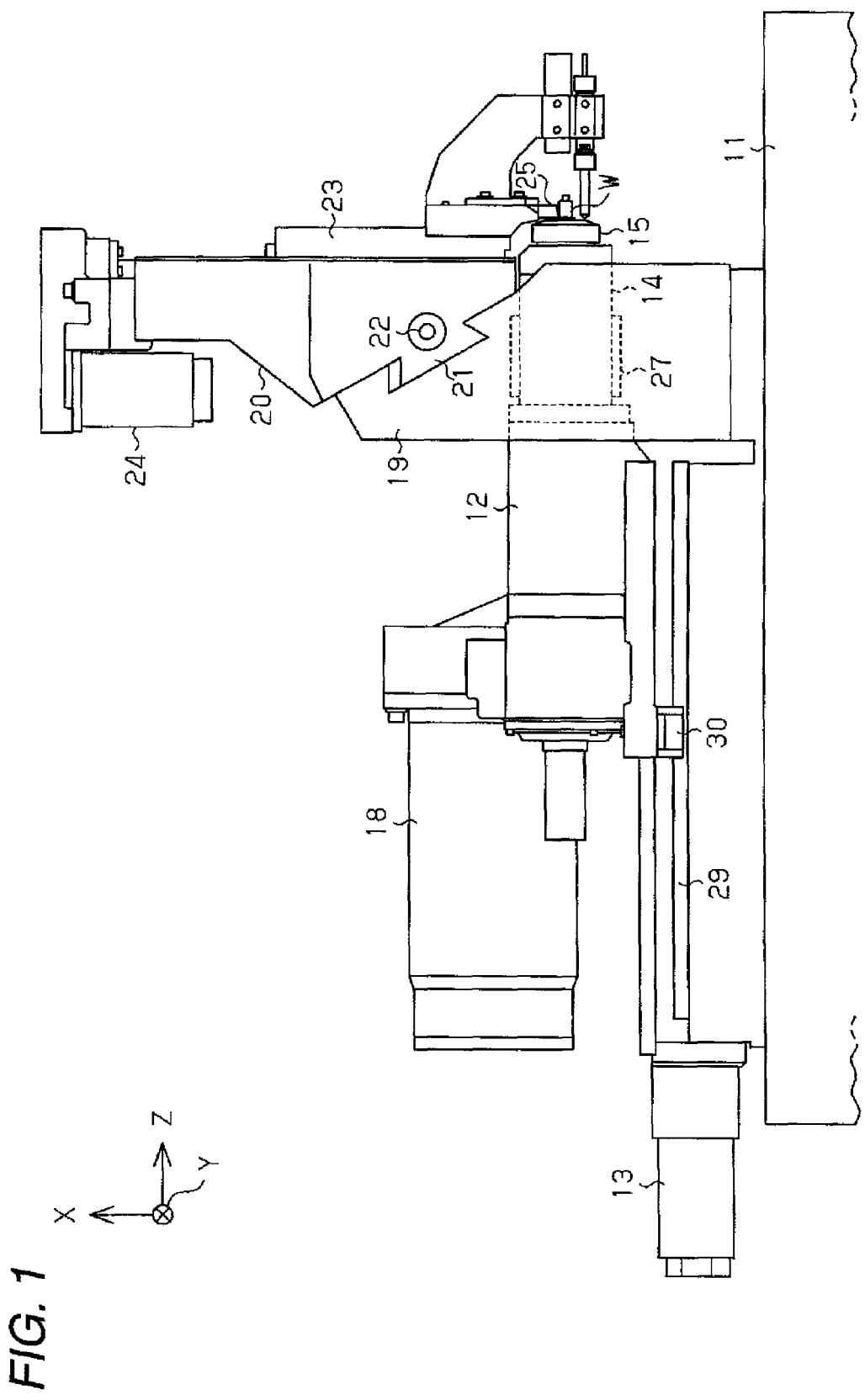
FIG. 1 is a front view showing a first embodiment of a lathe of main spindle movable type embodying the present invention.
Figure 2:
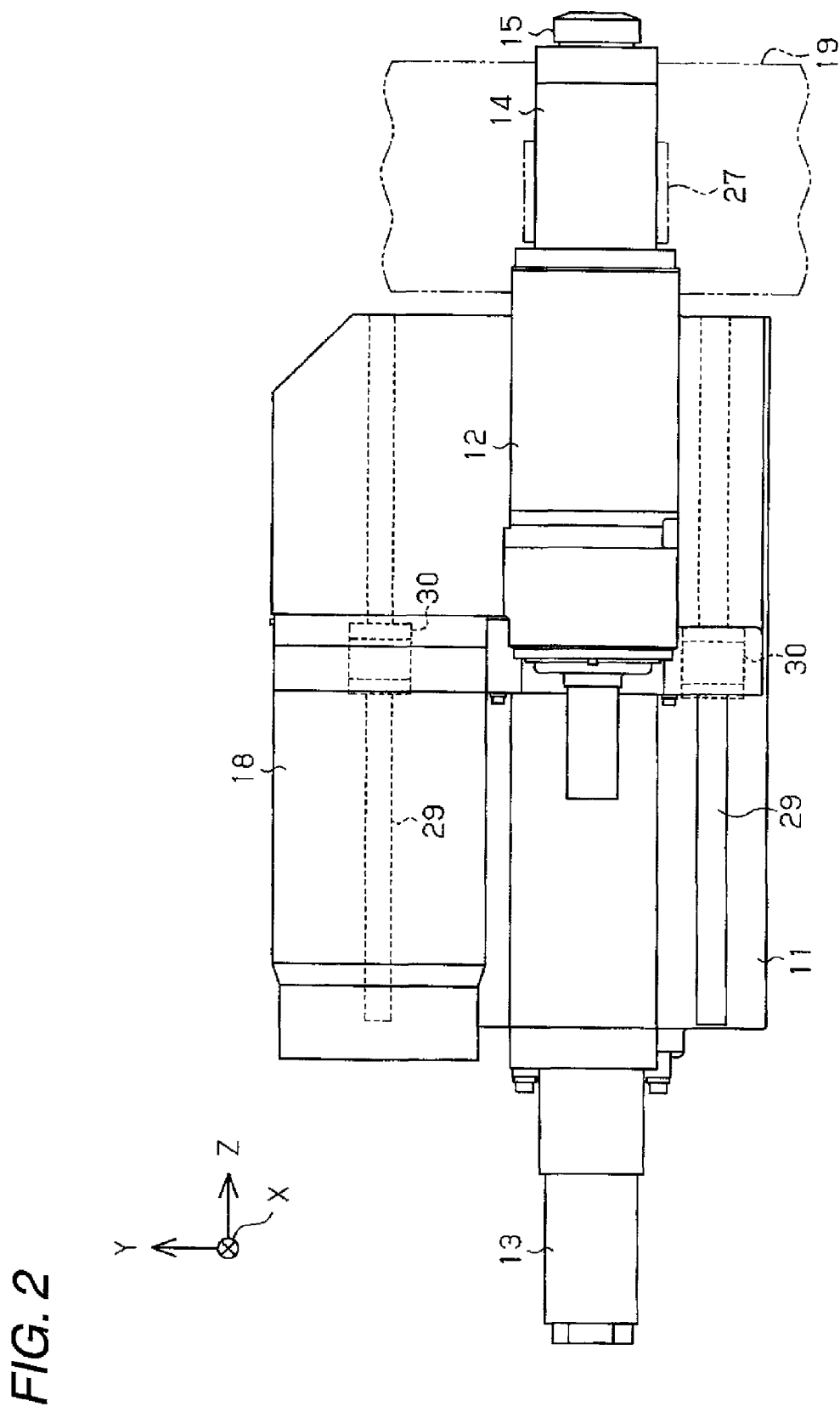
FIG. 2 is a plan view of the principal section showing, in an enlarged manner, a headstock of the lathe of main spindle movable type shown in FIG. 1.

As shown in FIGS. 1 and 2, in the lathe of main spindle movable type of the first embodiment, a headstock 12 is supported on a bed 11. A Z-axis movement motor 13 is disposed on the bed 11, and the headstock 12 is reciprocally actuated, at a base-end portion and a leading-edge portion thereof, by means of rotation of the motor 13 in a direction of a Z axis by way of an unillustrated ball screw feed mechanism.

Figure 3:
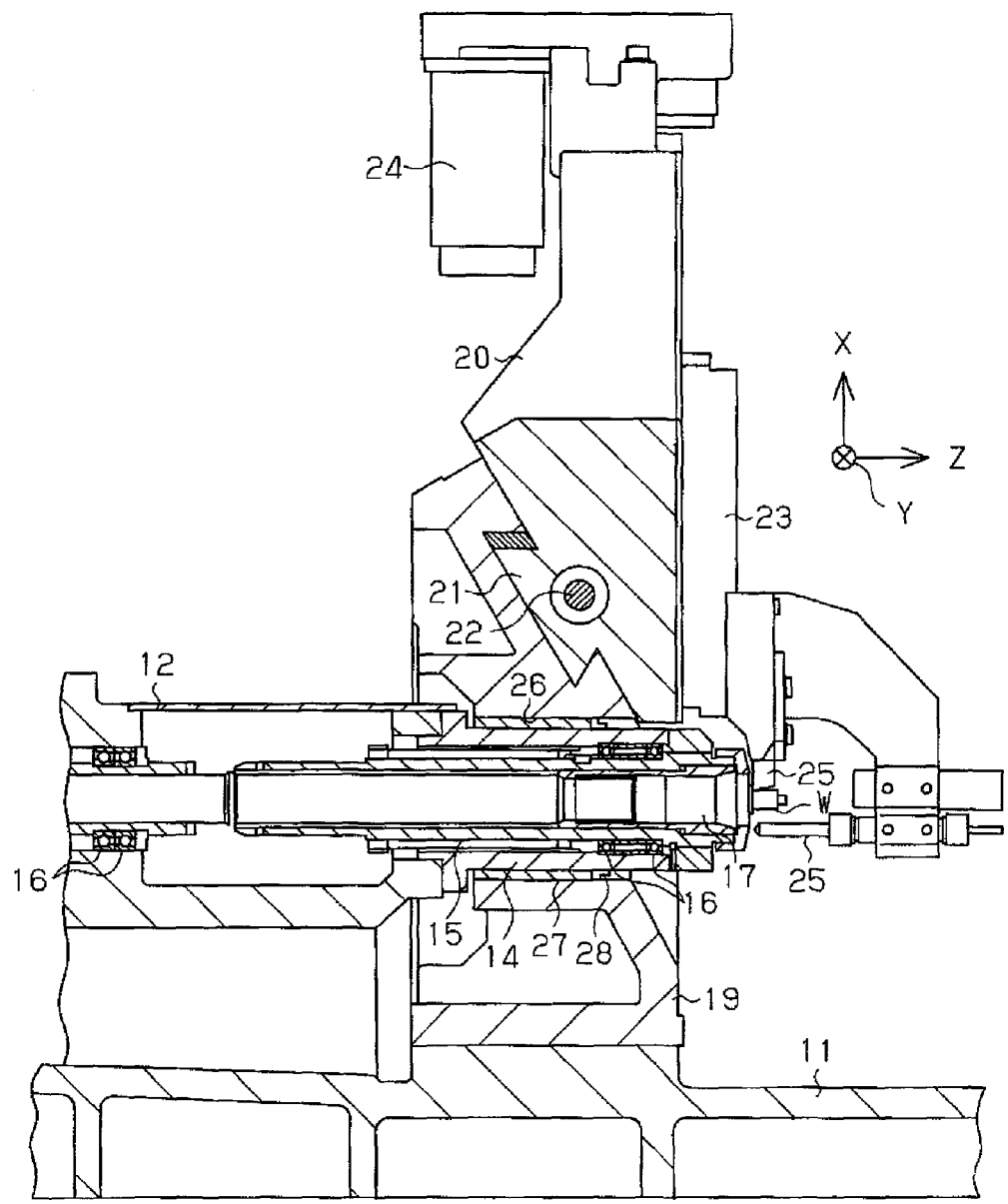
FIG. 3 is a fragmentary enlarged cross-sectional view of the lathe of main spindle movable type.

As shown in FIGS. 1 through 3, a cylindrical spindle sleeve 14 constituting a leading-edge portion of the headstock 12 is fixed to a front portion of the headstock 12. In the spindle sleeve 14, a main spindle 15 is supported so as to be rotatable around an axis extending in the direction of the Z axis by way of a plurality of bearings 16. A collet 17 for removably gripping a rod-shaped workpiece W is attached to the center of the leading end of the main spindle 15. A main spindle rotation motor 18 is disposed at the base-end portion of the headstock 12, and the main spindle 15 is rotated around its axis by means of rotation of the motor 18 and by way of an unillustrated transmission mechanism, such as a belt. A drive mechanism of the main spindle 15 disposed at the base-end portion of the headstock 12 is constituted of the main spindle rotation motor 18 and the transmission mechanism.

As shown in FIGS. 1 through 3, a tool post support 19 is fastened upright on the bed 11 forward of the headstock 12. The spindle sleeve 14 penetrates through the tool post support 19 in a movable manner. A Y-axis movable element 20 is supported by the tool post support 19 so as to be movable in the direction of a Y axis orthogonal to the Z axis by way of a dovetail-shaped guide section 21 and is reciprocally actuated by means of rotation of an unillustrated Y-axis movement motor in the direction of the Y axis by way of a ball screw feed mechanism 22. In the Y-axis movable element 20, a tool post 23 is supported so as to be movable in a direction of an X axis orthogonal to the Z axis and the Y axis, and the tool post 23 is reciprocally actuated by means of the X-axis movement motor 24 in the direction of the X axis by way of an unillustrated ball screw feed mechanism. A plurality of tools 25 for subjecting the workpiece W to machining, such as cutting, are supported on the tool post 23.

A configuration for guiding and supporting the headstock 12 so as to be movable in the direction of the Z axis will now be described.

Figure 4:
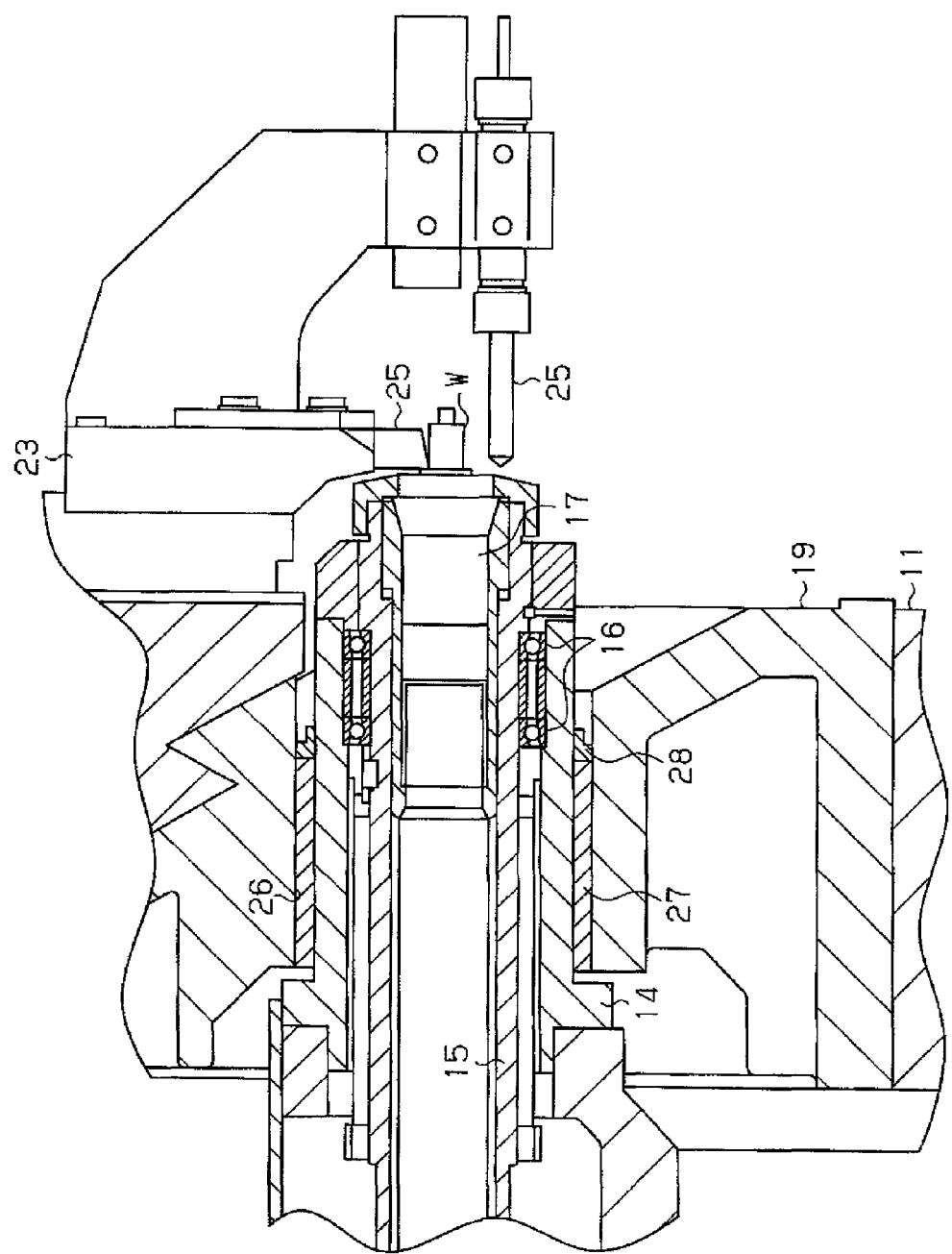
FIG. 4 is an enlarged cross-sectional view showing an area of a sliding bearing.

As shown in FIGS. 3 and 4, a through hole 26 is formed in the tool post support 19, and a cylindrical sliding bearing 27 is fitted into the through hole 26. The spindle sleeve 14 at the leading-edge of the headstock 12 is inserted into and supported by, while remaining in a surface contact with, the sliding bearing 27 so as to be able to move in the direction of the Z axis. A dust seal 28 for preventing intrusion of chips into the sliding bearing 27 is attached to a leading-edge portion of the sliding bearing 27.

As shown in FIGS. 1 and 2, a pair of guide rails 29 are laid on the upper surface of the bed 11 and on both sides of the axis of the main spindle 15 so as to extend in parallel to the direction of the Z axis. A base-end portion of the headstock 12 is supported at two positions, which are spaced apart from each other along the Y axis orthogonal to the axis of the main spindle 15, so as to be movable along the guide rails 29 by way of rolling bearings 30. Accordingly, the rolling bearings 30 are disposed in correspondence with the drive mechanism.

Figure 5:
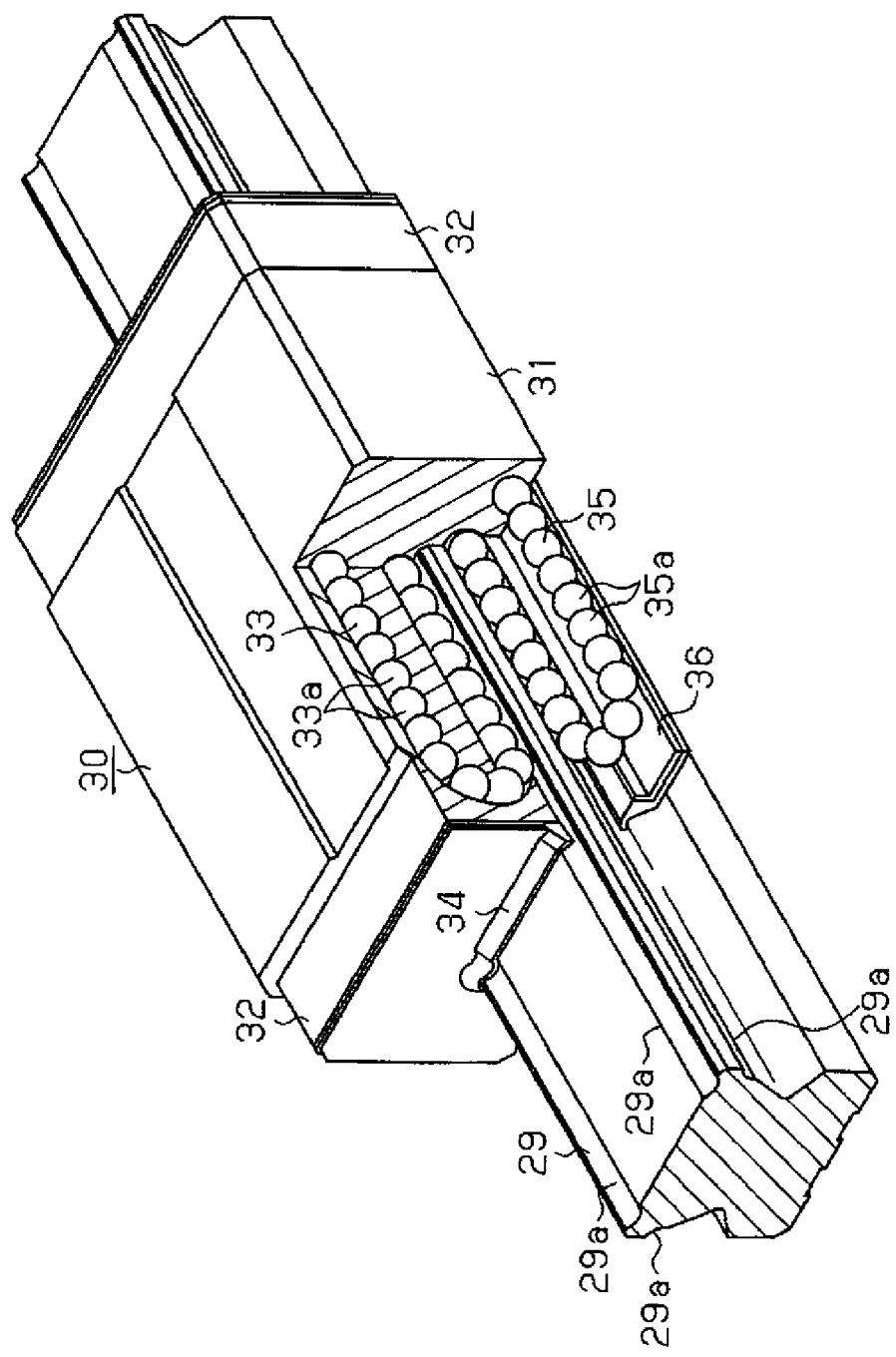
FIG. 5 is a partially-cutaway perspective view showing, in an enlarged manner, a rolling bearing for supporting the headstock of the lathe of the main spindle movable type.
Figure 6:
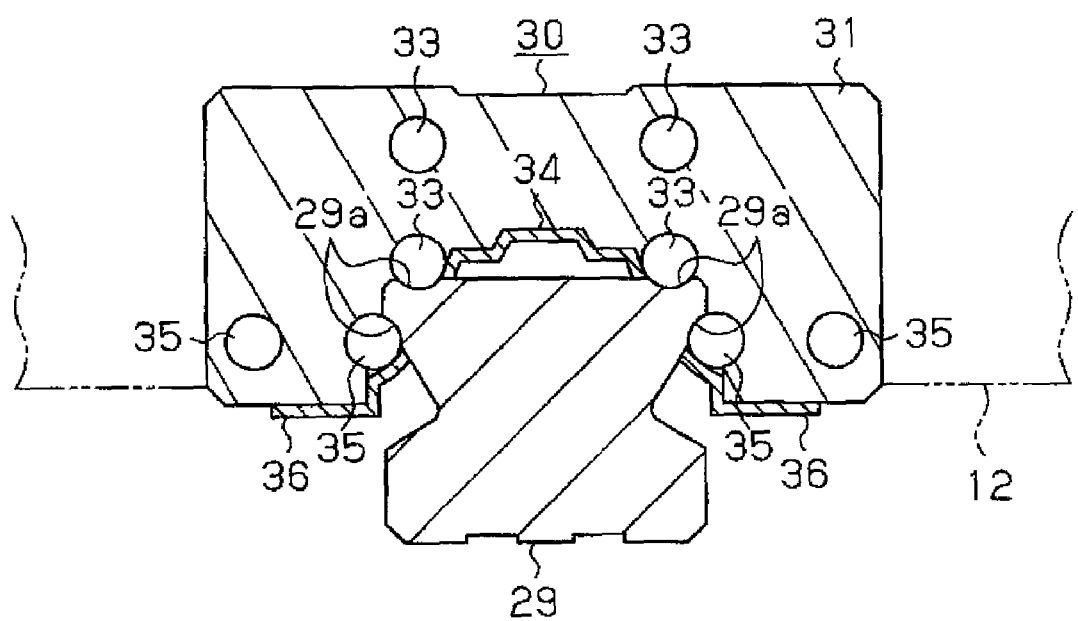
FIG. 6 is a cross-sectional view of the rolling bearing.

As shown in FIGS. 5 and 6, a block-shaped bearing main body 31 is fastened to a lower surface of the headstock 12 in each of the rolling bearings 30. A pair of end plates 32 are fastened to both longitudinal ends of the bearing main body 31. A first ball train 33 and a second ball train 35, which pair up with each other and which can move through the inside of guide grooves 29a formed on guide rails 29 in the bearing main body 31 are retained by retainers 34 and 36. Balls 33a and 35a of the first and second ball trains 33 and 35 are movable along annular channels closed by the end plates 32. By means of engagement of the respective balls 33a and 35a with the guide grooves 29a, the base-end portion of the headstock 12 is supported so as to be movable over the bed 11.

Operation of the lathe of main spindle movable type of the first embodiment configured as mentioned above will now be described.

In the lathe of main spindle movable type, when the rod-shaped workpiece W is subjected to machining, such as cutting, the workpiece W is attached to the leading-edge portion of the main spindle 15 by means of the collet 17, as shown in FIGS. 1 and 3. In this state, when the lathe of main spindle movable type is operated, the main spindle 15 is rotated by means of the main spindle rotation motor 18, whereupon the workpiece W is rotated around the axis of the main spindle 15. At this time, the Z-axis movement motor 13 moves the headstock 12 in the direction of the Z axis, and the tool post 23 is moved in at least any one of the directions of the X and Y axes by means of an unillustrated Y-axis movement motor and the X-axis movement motor 24. By means of movements, a tool 25 on the tool post 23 is placed at a position corresponding to a predetermined machining position on the workpiece W, and the workpiece W is subjected to machining, such as cutting, by means of the tool 25.

During machining of the workpiece W, the leading-edge portion of the headstock 12 is actuated on the tool post support 19 in the direction of the Z axis along the axis of the main spindle 15 while being guided by a sliding bearing 27. In conjunction with movement of the leading-edge portion, the base-end portion of the headstock 12 is smoothly guided over guide rails on the bed 11 by means of a rolling bearing 30 at two positions in the direction of the Y axis orthogonal to the axis of the main spindle 15. As shown in FIGS. 1 through 3, the headstock 12 can be smoothly guided and moved with high rigidity and accuracy along the axial direction of the main spindle 15, so that the machining precision and efficiency of the workpiece W can be enhanced.

Accordingly, working-effects provided below can be yielded in the first embodiment.

(1) The leading-edge portion of the headstock 12 is supported on the tool post support 19 by way of the sliding bearing 27, and the base-end portion of the headstock 12 is supported on the bed 11 at two positions so as to be movable by way of the rolling bearing 30. Therefore, the headstock 12 can be guided and moved with high rigidity and high precision along the axial direction of the main spindle 15 at a position close to the working position on the workpiece W, and the headstock 12 is smoothly, stably supported at a position spaced apart from the machining position on the workpiece. Accordingly, the main spindle 15 is supported at a position close to the working position on the workpiece W, as well as being supported stably at three points. Hence, high rigidity of guide surfaces and high guide precision can be assured. Therefore, even when a guide bush is not present, the workpiece W can be machined with high precision and at high efficiency. Consequently, even a short workpiece W can be machined, so that generation of a long remaining material can be avoided and the workpiece can be effectively utilized.

(2) Since the base-end portion of the headstock 12 is born by the rolling bearing 30, the headstock 12; namely, the main spindle 15, can be smoothly guided and moved with high accuracy. Specifically, the rigidity of the guide surfaces of the main spindle 15 and guide accuracy are assured by the sliding bearing 27 close to the machining position. A precision difference arising between the sliding bearing 27 and the rolling bearing 30 is absorbed by the rolling bearing, and hence a warp of the guide surfaces can be prevented.

(3) The headstock 12; namely, the main spindle 15, can be guided with high accuracy at three points. Hence, the sliding bearing 27 guiding the leading-edge portion of the headstock 12 may be of simple cylindrical shape. Therefore, machining of the guide surfaces is easy.

(4) Moreover, since the rolling bearings 30 are disposed on both sides of the axis of the main spindle 15, the headstock 12 can be stably supported, so that guide accuracy can be enhanced to a much greater extent.

The Second Preferred Embodiment

A second embodiment of the present invention will be described primarily in connection with a difference between the present embodiment and the first embodiment.

Figure 7:
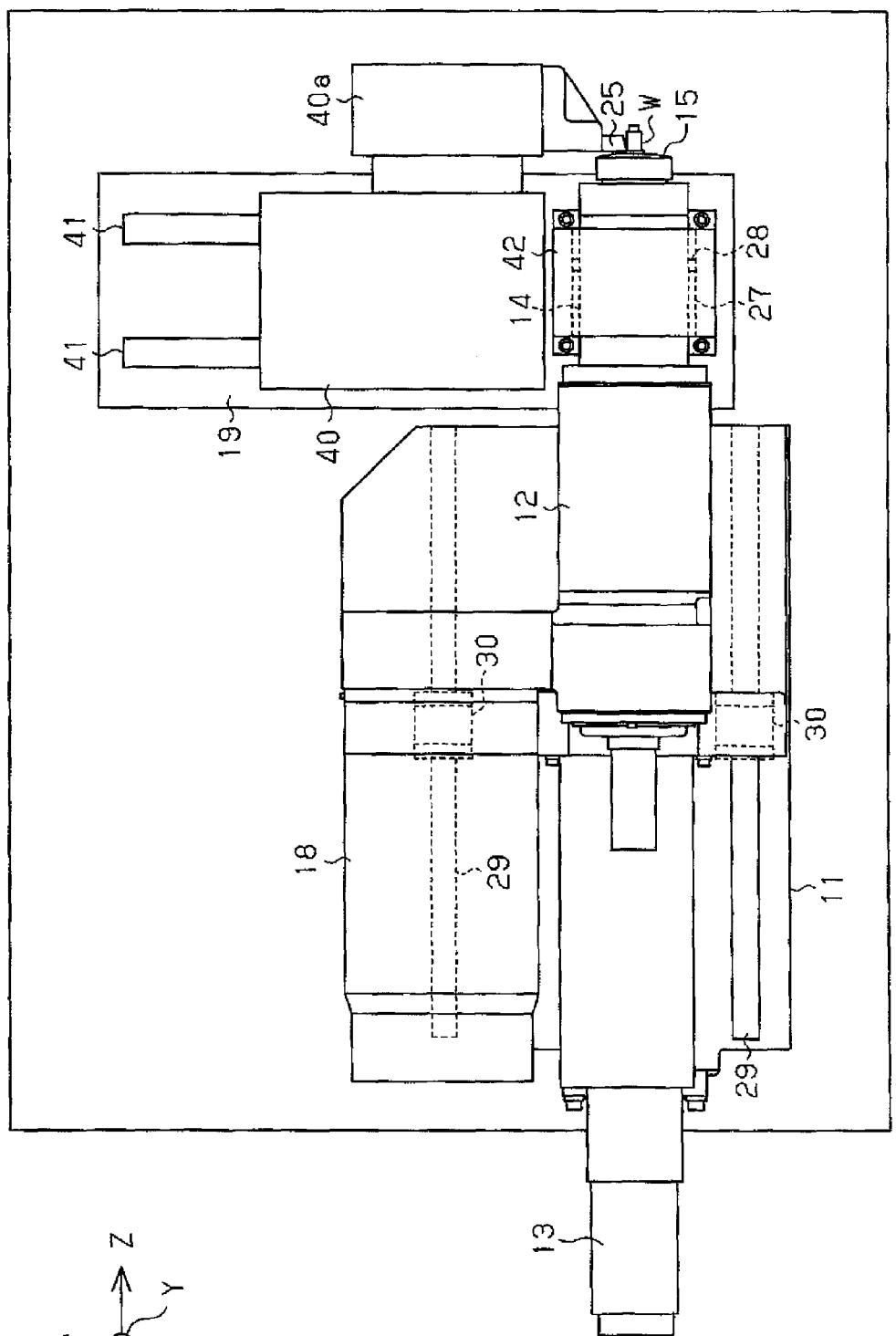
FIG. 7 is a plan view showing a second embodiment of the lathe of main spindle movable type.
Figure 8:
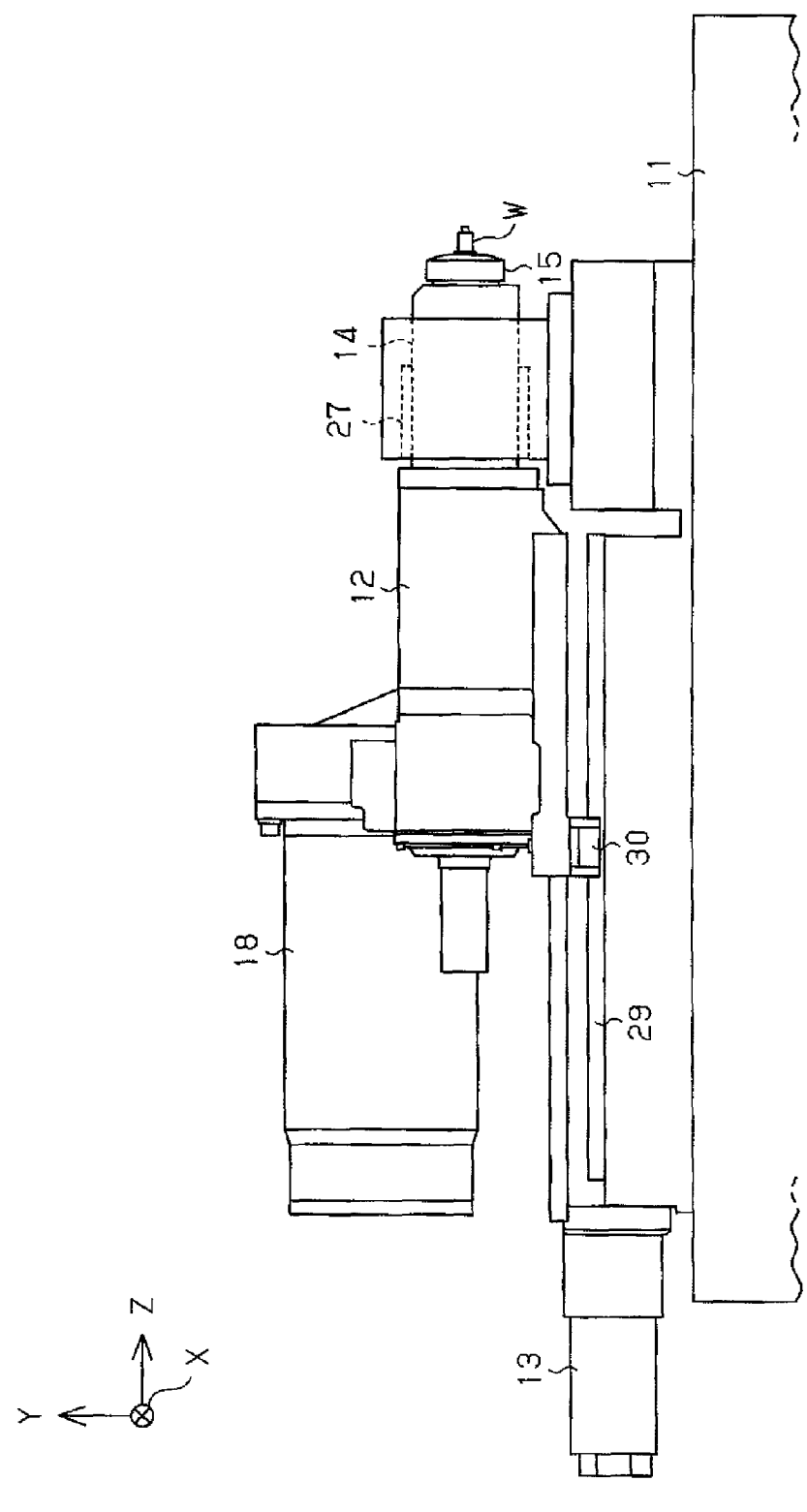
FIG. 8 is a front view showing the second embodiment.

As shown in FIGS. 7 and 8, in the second embodiment, a turret tool post 40 having a turret 40a is supported on the tool post support 19 along a pair of guide rails 41 so as to be movable in the direction of the X axis, and a plurality of tools 25 are supported by the turret tool post 40. The turret tool post 40 is reciprocally actuated in the direction of the X axis by way of a ball screw feed mechanism by means of an unillustrated X-axis movement motor, and the predetermined tools 25 are disposed at positions corresponding to machining positions on the workpiece W.

In the second embodiment, through holes are not formed in the tool post support 19, and a bearing element 42 is attached to an exterior surface of the tool post support 19. The cylindrical sliding bearing 27 analogous to that described in connection with the first embodiment is housed in the bearing element 42, and the leading-edge portion of the headstock 12 is inserted into and supported by the sliding bearing 27 so as to be movable in the direction of the X axis. Moreover, as in the case of the first embodiment, the base-end portion of the headstock 12 is supported in a movable manner, at two positions spaced apart from each other along the X axis orthogonal to the axis of the main spindle 15, by the guide rails 29 on the bed 11 by way of the rolling bearing 30.

Even the second embodiment can yield advantages analogous to those described in connection with the first embodiment.

Modification

The present embodiment can also be embodied while being modified as follows.

A hydrostatic bearing is used as the sliding bearing 27.

A roller bearing is used as the rolling bearing 30.

What is claimed is:

1. A machine tool for machining a workpiece comprising:
a main spindle that holds the workpiece to rotate the workpiece around a axis;
a tool that is configured to machine the workpiece by working together with the main spindle;
a headstock that rotatably supports the main spindle and includes a leading-edge portion and a base-end portion; and
a bed that supports the headstock by a sliding bearing at the leading-edge portion and rolling bearings at two points of the base-end portion so that the headstock is movable along an axial line of the main spindle,
wherein the two points of the base-end portion are spaced apart from each other in a direction orthogonal to the axial line of the main spindle.

2. The machine tool according to claim 1, wherein a tool post support is fastened onto the bed;
wherein the tool post is supported on the tool post support, and
wherein the leading-edge portion of the headstock is supported by the sliding bearing onto the tool post support.

3. The machine tool according to claim 2, wherein the headstock has a spindle sleeve to rotatably support the main spindle in the spindle sleeve, and
wherein the spindle sleeve is supported by the sliding bearing.

4. The machine tool according to claim 3, wherein each of the rolling bearings is a ball bearing that moves on a guide rail.

5. The machine tool according to claim 4, wherein the rolling bearings are provided on both sides of the axial line of the main spindle.

6. The machine tool according to claim 3 wherein the rolling bearings are provided on both sides of the axial line of the main spindle.

7. The machine tool according to claim 2, wherein each of the rolling bearings is a ball bearing that moves on a guide rail.

8. The machine tool according to claim 7, wherein the rolling bearings are provided on both sides of the axial line of the main spindle.

9. The machine tool according to claim 2, wherein the rolling bearings are provided on both sides of the axial line of the main spindle.

10. The machine tool according to claim 1, wherein the headstock has a spindle sleeve to rotatably support the main spindle in the spindle sleeve, and
wherein the spindle sleeve is supported by the sliding bearing.

11. The machine tool according to claim 10, wherein each of the rolling bearings is a ball bearing that moves on a guide rail.

12. The machine tool according to claim 11, wherein the rolling bearings are provided on both sides of the axial line of the main spindle.

13. The machine tool according to claim 10, wherein the rolling bearings are provided on both sides of the axial line of the main spindle.

14. The machine tool according to claim 1, wherein each of the rolling bearings is a ball bearing that moves on a guide rail.

15. The machine tool according to claim 14, wherein the rolling bearings are provided on both sides of the axial line of the main spindle.

16. The machine tool according to claim 1, wherein the rolling bearings are provided on both sides of the axial line of the main spindle.

* * * * *